(12) United States Patent
Knott et al.

(10) Patent No.: US 11,591,448 B2
(45) Date of Patent: *Feb. 28, 2023

(54) PHYSICAL REUTILIZATION OF SILICONIZED SHEETS

(71) Applicant: Evonik Operations GmbH, Essen (DE)

(72) Inventors: Wilfried Knott, Essen (DE); Horst Dudzik, Essen (DE); Dietmar Schaefer, Hattingen (DE)

(73) Assignee: Evonik Operations GmbH, Essen (DE)

( * ) Notice: Subject to any disclaimer, the term of this patent is extended or adjusted under 35 U.S.C. 154(b) by 152 days.

This patent is subject to a terminal disclaimer.

(21) Appl. No.: 17/177,489

(22) Filed: Feb. 17, 2021

(65) Prior Publication Data

US 2021/0301099 A1   Sep. 30, 2021

(30) Foreign Application Priority Data

Mar. 27, 2020   (EP) .................................... 20166133

(51) Int. Cl.
*C08J 11/26*   (2006.01)

(52) U.S. Cl.
CPC ............ *C08J 11/26* (2013.01); *C08J 2301/02* (2013.01); *C08J 2323/12* (2013.01); *C08J 2367/02* (2013.01); *C08J 2483/04* (2013.01)

(58) Field of Classification Search
USPC ............................ 428/411.1; 521/47; 528/26
See application file for complete search history.

(56) References Cited

U.S. PATENT DOCUMENTS

| | | | |
|---|---|---|---|
| 2,910,496 A | 10/1959 | Bailey et al. | |
| 3,032,529 A | 5/1962 | Clark | |
| 3,035,016 A | 5/1962 | Bruner | |
| 5,371,161 A | 12/1994 | Knott | |
| 5,430,166 A | 7/1995 | Klein et al. | |
| 5,430,167 A | 7/1995 | Klein et al. | |
| 5,455,367 A | 10/1995 | Klein et al. | |
| 5,475,127 A | 12/1995 | Klein et al. | |
| 5,856,548 A | 1/1999 | Droese et al. | |
| 6,255,511 B1 | 7/2001 | Klein et al. | |
| 6,291,622 B1 | 9/2001 | Droese et al. | |
| 6,307,082 B1 | 10/2001 | Klein et al. | |
| 6,489,498 B2 | 12/2002 | Klein et al. | |
| 6,858,663 B2 | 2/2005 | Knott et al. | |
| 7,018,458 B2 | 3/2006 | Knott et al. | |
| 7,125,585 B2 | 10/2006 | Dudzik et al. | |
| 7,157,541 B2 | 1/2007 | Knott et al. | |
| 7,196,153 B2 | 3/2007 | Burkhart et al. | |
| 7,598,334 B2 | 10/2009 | Ferenz et al. | |
| 7,612,158 B2 | 11/2009 | Burkhart et al. | |
| 7,612,159 B2 | 11/2009 | Burkhart et al. | |
| 7,619,035 B2 | 11/2009 | Henning et al. | |
| 7,645,848 B2 | 1/2010 | Knott et al. | |
| 7,754,778 B2 | 7/2010 | Knott et al. | |
| 7,825,205 B2 | 11/2010 | Knott et al. | |
| 7,825,206 B2 | 11/2010 | Neumann et al. | |
| 7,825,209 B2 | 11/2010 | Knott et al. | |
| 8,138,294 B2 | 3/2012 | Henning et al. | |
| 8,247,525 B2 | 8/2012 | Schubert et al. | |
| 8,268,939 B2 | 9/2012 | Ebbrecht et al. | |
| 8,283,422 B2 | 10/2012 | Schubert et al. | |
| 8,309,664 B2 | 11/2012 | Knott et al. | |
| 8,309,673 B2 | 11/2012 | Schubert et al. | |
| 8,324,325 B2 | 12/2012 | Knott et al. | |
| 8,334,355 B2 | 12/2012 | Henning et al. | |
| 8,349,907 B2 | 1/2013 | Henning et al. | |
| 8,420,748 B2 | 4/2013 | Henning et al. | |
| 8,450,514 B2 | 5/2013 | Schubert et al. | |
| 8,455,603 B2 | 6/2013 | Ferenz et al. | |
| 8,557,944 B2 | 10/2013 | Henning et al. | |
| 8,598,295 B2 | 12/2013 | Henning et al. | |
| 8,609,798 B2 | 12/2013 | Knott et al. | |
| 8,623,984 B2 | 1/2014 | Henning et al. | |
| 8,722,834 B2 | 5/2014 | Knott et al. | |
| 8,722,836 B2 | 5/2014 | Knott et al. | |
| 8,729,207 B2 | 5/2014 | Hartung et al. | |
| 8,772,423 B2 | 7/2014 | De Gans et al. | |
| 8,779,079 B2 | 7/2014 | Henning et al. | |
| 8,802,744 B2 | 8/2014 | Knott et al. | |
| 8,841,400 B2 | 9/2014 | Henning et al. | |
| 8,921,437 B2 | 12/2014 | Knott et al. | |

(Continued)

FOREIGN PATENT DOCUMENTS

| | | |
|---|---|---|
| CA | 3099860 A1 | 11/2019 |
| CA | 3099861 A1 | 11/2019 |

(Continued)

OTHER PUBLICATIONS

Knott et al., U.S. Appl. No. 17/239,011, filed Apr. 23, 2021.
Knott et al., U.S. Appl. No. 17/476,417, filed Sep. 15, 2021.
Enthaler, "Iron-Catalyzed Depolymerization of Polysiloxanes to Produce Dichlorodimethylsilane, Diacetoxydimethylsilane, or Dimethoxydimethylsilane," copyright Jan. 2015, Journal of Applied Polymer Science, Bd. 132, Nr. 3 (8 pages).
European Search Report dated Aug. 10, 2020 in EP 20166133.7 (9 pages).

*Primary Examiner* — Terressa Boykin

(74) *Attorney, Agent, or Firm* — Taylor English Duma LLP; Philip P. McCann

(57) ABSTRACT

The method for the physical reutilization of sheet-like siliconized structures comprises treating the sheet-like siliconized structure in a liquid digestion system comprising acetic anhydride and/or an acetoxysiloxane, and at least one Brønsted acid, optionally solvent, preferably with addition of acetic acid, and removing the desiliconized sheet-like structure from the liquid phase.

20 Claims, No Drawings

(56) References Cited

U.S. PATENT DOCUMENTS

| | | |
|---|---|---|
| 8,946,369 B2 | 2/2015 | Henning et al. |
| 8,957,009 B2 | 2/2015 | Schubert et al. |
| 8,969,502 B2 | 3/2015 | Knott et al. |
| 8,974,627 B2 | 3/2015 | Schubert et al. |
| 8,993,706 B2 | 3/2015 | Schubert et al. |
| 9,035,011 B2 | 5/2015 | Ferenz et al. |
| 9,068,044 B2 | 6/2015 | Schubert et al. |
| 9,315,614 B2 | 4/2016 | Schubert et al. |
| 9,334,354 B2 | 5/2016 | Ferenz et al. |
| 9,353,225 B2 | 5/2016 | Knott et al. |
| 9,441,145 B2 | 9/2016 | Schubert et al. |
| 9,481,695 B2 | 11/2016 | Knott et al. |
| 9,695,202 B2 | 7/2017 | Henning et al. |
| 9,783,635 B2 | 10/2017 | Schubert et al. |
| 9,896,541 B2 | 2/2018 | Fiedel et al. |
| 9,975,909 B2 | 5/2018 | Schubert et al. |
| 10,087,278 B2 | 10/2018 | Lobert et al. |
| 10,099,211 B2 | 10/2018 | Knott et al. |
| 10,106,649 B2 | 10/2018 | Fiedel et al. |
| 10,399,998 B2 | 9/2019 | Knott et al. |
| 10,407,592 B2 | 9/2019 | Amajjahe et al. |
| 10,414,871 B2 | 9/2019 | Knott et al. |
| 10,414,872 B2 | 9/2019 | Knott et al. |
| 10,519,280 B2 | 12/2019 | Knott et al. |
| 10,526,454 B2 | 1/2020 | Knott et al. |
| 10,544,267 B2 | 1/2020 | Knott et al. |
| 10,752,735 B2 | 8/2020 | Knott et al. |
| 10,766,913 B2 | 9/2020 | Knott et al. |
| 10,836,867 B2 | 11/2020 | Knott |
| 10,954,344 B2 | 3/2021 | Knott et al. |
| 11,021,575 B2 | 6/2021 | Knott et al. |
| 11,066,429 B2 | 7/2021 | Knott et al. |
| 11,286,366 B2 * | 3/2022 | Knott .................. C08J 11/26 |
| 2002/0161158 A1 | 10/2002 | Burkhart et al. |
| 2007/0128143 A1 | 6/2007 | Gruning et al. |
| 2008/0076689 A1 | 3/2008 | Matthews |
| 2009/0137752 A1 | 5/2009 | Knott et al. |
| 2010/0012623 A1 | 1/2010 | Mignani |
| 2010/0022435 A1 | 1/2010 | Henning et al. |
| 2010/0081781 A1 | 4/2010 | Schubert et al. |
| 2011/0230619 A1 | 9/2011 | Kuppert et al. |
| 2011/0301254 A1 | 12/2011 | Knott et al. |
| 2012/0068110 A1 | 3/2012 | Schubert et al. |
| 2012/0282210 A1 | 11/2012 | Henning et al. |
| 2013/0041115 A1 | 2/2013 | Knott et al. |
| 2013/0213267 A1 | 8/2013 | Fiedel et al. |
| 2013/0345318 A1 | 12/2013 | Schubert et al. |
| 2014/0256844 A1 | 9/2014 | Henning et al. |
| 2014/0309446 A1 | 10/2014 | Amajjahe et al. |
| 2015/0004112 A1 | 1/2015 | Ritter et al. |
| 2015/0004113 A1 | 1/2015 | Ritter et al. |
| 2016/0130402 A1 | 5/2016 | Schubert et al. |
| 2018/0016392 A1 | 1/2018 | Lobert et al. |
| 2018/0258228 A1 | 9/2018 | Amajjahe et al. |
| 2018/0305596 A1 | 10/2018 | Schubert et al. |
| 2019/0106369 A1 | 4/2019 | Schubert et al. |
| 2020/0055991 A1 | 2/2020 | Knott et al. |
| 2020/0055992 A1 | 2/2020 | Knott et al. |
| 2020/0339612 A1 | 10/2020 | Knott et al. |
| 2020/0377524 A1 | 12/2020 | Knott et al. |
| 2020/0377525 A1 | 12/2020 | Knott et al. |
| 2020/0377640 A1 | 12/2020 | Knott et al. |
| 2020/0377660 A1 | 12/2020 | Knott et al. |
| 2020/0377663 A1 | 12/2020 | Favresse et al. |
| 2020/0377665 A1 | 12/2020 | Knott et al. |
| 2020/0377666 A1 | 12/2020 | Knott et al. |
| 2020/0377667 A1 | 12/2020 | Favresse et al. |
| 2020/0377669 A1 | 12/2020 | Knott et al. |
| 2020/0377684 A1 | 12/2020 | Hermann et al. |
| 2020/0377686 A1 | 12/2020 | Knott et al. |
| 2020/0385528 A1 | 12/2020 | Knott |
| 2021/0130551 A1 | 5/2021 | Knott et al. |
| 2021/0163687 A1 | 6/2021 | Knott et al. |
| 2021/0171719 A1 | 6/2021 | Knott et al. |
| 2021/0253780 A1 | 8/2021 | Wessely et al. |
| 2021/0253799 A1 | 8/2021 | Knott et al. |

FOREIGN PATENT DOCUMENTS

| | | |
|---|---|---|
| DE | 42 39 246 C1 | 12/1993 |
| DE | 195 02 393 A1 | 8/1996 |
| DE | 103 37 309 A1 | 3/2005 |
| DE | 10 2012 210 556 A1 | 12/2013 |
| DE | 10 2013 208 328 A1 | 11/2014 |
| DE | 10 2014 211 680 A1 | 2/2015 |
| DE | 10 2009 019 002 U1 | 5/2015 |
| EP | 0 514 737 A1 | 11/1992 |
| EP | 0 587 000 A1 | 3/1994 |
| EP | 0 950 684 B2 | 10/1999 |
| EP | 1 350 804 A1 | 10/2003 |
| EP | 2 542 728 B1 | 9/2015 |
| EP | 3 611 214 A1 | 2/2020 |
| EP | 3 611 215 A1 | 2/2020 |
| EP | 3 611 216 A1 | 2/2020 |
| EP | 3 611 217 A1 | 2/2020 |
| EP | 3 663 346 A1 | 6/2020 |
| EP | 3 744 774 A1 | 12/2020 |
| JP | H04 318075 | 11/1992 |
| JP | 2015 013976 | 1/2015 |
| KR | 102 045 487 B1 | 11/2019 |
| WO | 2008/097306 A1 | 8/2008 |
| WO | 2013/010747 A1 | 1/2013 |
| WO | 2021/058263 A1 | 4/2021 |

* cited by examiner

PHYSICAL REUTILIZATION OF SILICONIZED SHEETS

This application is a 35 U.S.C. § 119 patent application which claims the benefit of European Application No. 20166133.7 filed Mar. 27, 2020, which is incorporated herein by reference in its entirety.

FIELD

The present invention is situated in the field of silicones and sheet-like, silicone-coated structures, and is concerned more particularly with the physical reutilization of such structures.

BACKGROUND

The silicone coating of certain sheet-like structures, more particularly both paper and polymeric structures, is known practice in order to modify the surface of the structure, so as to generate a non-stick surface, for example. Silicone-coated papers or polymeric films of this kind are available on the market for a variety of end uses.

Silicone-coated paper is used, for example, as a base paper for pressure-sensitive adhesive labels, self-adhesive films and self-adhesive tapes, or as release paper for PVC film manufacture. This coated paper accumulates in considerable quantities at the premises both of manufacturers and of users, and by far the largest proportion of this paper, after having fulfilled its function as a base paper or release paper, is sent to landfill or disposed of thermally—that is, incinerated. To date, only in exceptional cases have lower-quality papers been produced from these papers, for packaging uses.

The significance of this topic for the goal of a circular economy is apparent, for example, from production figures for the years 2008 and 2010, taken from the PTS (Papiertechnische Stiftung) Research Report IGF_16407, Development of a coating concept for producing silicone release papers using the multi-layer curtain coater technology, by M. Staubner and H. Schmid, www.ptspaper.de. The report reads as follows on page 6: "The 2008 worldwide production volume of 33.7 billion $m^2$ of release paper was increased in 2010 to only 33.98 billion $m^2$. Of this, 52% in 2008 and 51.5% in 2010 were utilized for labels alone."

Aside from the paper-based systems, polymeric films (for example polyolefins, and here more particularly the monoaxially oriented polypropylene films (MOPP), biaxially oriented polypropylene films (BOPP), and also the polyester release films (PETP)) are increasingly being provided with silicone coatings.

MOPP systems are frequently used to protect adhesive surfaces in—for example—the lining of self-adhesive closures, and also in envelopes, pouches and cartons, and in the lining of self-adhesive cable ducts or else in component assembly by automotive and smartphone manufacturers.

The polyester release films (PETP) furnished with a silicone release system are increasingly being used in the electrical industry as release films for the pressing and forming of prepreg-insulated conductors, in the plastics industry as a release film in the production of plates from casting compounds, in the chemical industry as a release film, with siliconization on both sides, for the packaging, for example, of waxes and resins displaying clinging and sticking effects, and also as a release film in the production of adhesive tape, and in the rubber industry, in the rubber manufacturing operation, as protection from instances of sticking, and also in the electronics industry, as a release film during the production of multi-layer PCBs.

The prior art refers to various efforts toward the recycling of silicone-coated papers. For instance, the teaching of EP 0587000 A1 claims a method for recycling silicone-coated paper in flotation de-inking apparatus, using 10% strength sodium hydroxide solution, by beating and forming new sheets, that method being characterized in that the beating takes place in the presence of one or more salts of phosphoric esters of fluorinated alkanols. According to the teaching, the use of these exotic process auxiliaries is necessary in order to avoid typical problems in the alkaline recycling operation, such as poor pulp dissolution, incomplete resin dispersion, and also the formation of resin agglomerates and the associated risk of sticking on cylinder surfaces and felts.

A further operation for the recycling of silicone-coated, cellulose-based and/or polymeric carrier systems is claimed by the company Reculiner (Belgium) in EP 2542728 B1, but is geared solely to their utilization as materials. Here, for example, silicone-coated release paper waste is utilized for cellulose fiber insulation, employed for heat insulation and soundproofing in the construction sector. The release paper is treated for example with flame retardants and is thereafter processed into lightweight flakes, using specially developed equipment. The accompanying claim is that one of the most important advantages of the cellulose fiber insulation obtained not from conventional waste paper (such as newspapers, for example) but instead from a release paper of this kind lies in the greater elasticity of the fibers it contains. This property is said then to result in better fixation, meaning an improved resistance to the possible sinking of the insulating material following its blown injection into a cavity wall. By comparison with the traditional cellulose fiber insulation, obtained preferably from old newspapers, a further improvement on the part of the RecuLiner material is said to lie in its increased flowability, making it easier to apply.

In the as yet unpublished European patent application with the application Ser. No. 19/176,869.6, a new process is described for recycling silicones, more particularly silicone rubber and/or silicone oils, by the chemical transformation thereof into silanes and/or siloxanes containing acetoxy groups, wherein the silicones for recycling are subjected to a heat treatment in digestion systems comprising acetic anhydride and/or acetoxysiloxane, and at least one Brønsted acid, preferably with addition of acetic acid.

Not disclosed there, however, is the recycling of sheet-like siliconized structures such as, for example, siliconized release papers and siliconized polymeric films, respectively.

SUMMARY

Against this background, the object of the present invention was to provide a method for the physical reutilization of sheet-like siliconized structures, more particularly siliconized papers or siliconized polymeric films.

DETAILED DESCRIPTION

The inventors have surprisingly found that the process described in the as yet unpublished European patent application with the application Ser. No. 19/176,869.6 also enables the recycling of silicones applied as a release coating on sheet-like structures, such as cellulose-based carriers (paper, etc.) and on polymeric films (for example polyolefins, and among them more particularly the monoaxially oriented polypropylene films (MOPP) and the biaxially oriented polypropylene films (BOPP), and also the polyester release films (PETP)). In this way, accordingly, the path is opened up to physical re-use of the respective sheet-like siliconized structures.

A subject of the present invention is therefore a method for the physical reutilization of sheet-like siliconized structures, more particularly siliconized papers or siliconized polymeric films, which comprises at least the following steps:
a) treating the sheet-like siliconized structure in a liquid digestion system comprising acetic anhydride and/or an acetoxysiloxane, and also at least one Brønsted acid, and optionally solvent, preferably with addition of acetic acid,
b) removing the desiliconized sheet-like structure from the liquid phase.

The silicone coatings to be collected for the method of the invention encompass all of the silicone coatings known in the market, especially the established, solvent-free or solvent-containing, platinum-catalysed systems, but also UV-activated systems with radical or cationic polymerization, which are easy to process. Sheet-like siliconized structures in the sense of this invention are, in particular, papers or polymeric films which have a silicone coating.

Shunning the pathway of merely material utilization and the above-described pathway of de-inking using exotic process auxiliaries (EP 0587000 A1) and practised on cellulose-containing and/or polymeric siliconized carrier systems, then, the method of the invention opens up for the first time a new and previously unexploited opportunity for the complete physical reutilization of sheet-like siliconized structures, such as, in particular, siliconized release liner systems.

The method of the invention enables more particularly the discrete recovery of valuable natural substances (for example cellulose) and of synthetic polymers (for example polypropylene) which have been brought into intense contact with silicone materials.

It also enables the recycling of the coating silicones, through their chemical transformation into silanes and/or siloxanes containing acetoxy groups. These chemical compounds, optionally in combination with other reactive silanes and/or silicones as well, can be processed further into a multiplicity of valuable derivative silicone products. This is a very significant advantage of the present invention.

For example, the European patent applications EP3611214A1, EP3611216A1, EP3611217A1, EP3611215A1 and also the as yet unpublished European patent application with the application Ser. No. 18/210, 035.4 show the production and processing of siloxanes which carry acetoxy groups to give SiOC-based polyether siloxanes, and the likewise as yet unpublished European patent application with the application Ser. No. 19/200, 055.2 also shows the processing thereof to give siloxanes carrying (meth)acrylic acid groups, for release applications, for example.

The method of the invention is described in more detail below.

Step a) employs a liquid digestion system comprising acetic anhydride and/or an acetoxysiloxane, and at least one Brønsted acid, and optionally solvent. According to one particularly preferred embodiment, the method of the invention is carried out in step a) with addition of acetic acid.

In a preferred embodiment of the invention, the digestion system used comprises
i) acetic anhydride and Brønsted acid, ii) acetic anhydride, siloxane cycles and/or hydroxy-functional siloxanes and Brønsted acid, iii) acetoxysiloxane and Brønsted acid, or iv) acetoxysiloxane, siloxane cycles and/or hydroxy-functional siloxanes, acetic anhydride and Brønsted acid, preferably with addition of acetic acid in each case.

Preferably in accordance with the invention, Brønsted acids used are protic acids with a pKa of less than −1.30, such as preferably nitric acid, methanesulfonic acid and para-toluenesulfonic acid, preferably protic acids having a pKa of less than −2.90, such as preferably concentrated sulfuric acid,
more preferably protic acids having a pKa of less than −4.90, such as preferably the perfluoroalkanesulfonic acids such as heptafluoropropanesulfonic acid, pentafluoroethanesulfonic acid, trifluoromethanesulfonic acid, then perchloric acid and chlorosulfonic acid,
with preference among these especially for perfluoroalkanesulfonic acids, and very particular preference here for trifluoromethanesulfonic acid,
and additionally also preferably sulfonic acid or perfluoroalkylsulfonic acid ion exchange resins, for example in the form of the commercially available Amberlyst® and Lewatit® products, but also in the form of the perfluoroalkylsulfonic acid resins such as Nafion® (for example the NR 50 type).

The Brønsted acid for use with particular preference in accordance with the invention is a perfluoroalkanesulfonic acid, and most preferably trifluoromethanesulfonic acid.

Within the invention it is possible in principle to recycle all the silicones which are contemplated for the coating of sheet-like paper or polymeric structures.

According to one preferred embodiment of the invention, the method takes place with supply of heat and/or, preferably and, with introduction of mechanical energy.

With preference in accordance with the invention, a heat treatment of the sheet-like siliconized structures is undertaken in the digestion system preferably between 50° C. and 200° C., more preferably between 80° C. and 160° C., more particularly between 120° C. and 150° C.

The mechanical energy may be introduced into the digestion system in particular in the form of stirring energy or ultrasound. On the production scale, it is possible in particular to employ stirred reactors (stirred tanks) which are commonplace within chemical engineering.

The method of the invention may advantageously be undertaken at standard pressure (1013 hPa), at reduced pressure, or else, in order to achieve high heat treatment temperatures of up to 200° C., in pressure-rated apparatuses under elevated pressure. The method of the invention is preferably carried out at standard pressure.

Preferably in accordance with the invention, the Brønsted acid used in the digestion systems is used in amounts advantageously of 0.1 to 1.5 percent by mass, preferably in amounts of 0.15 to 1.0 percent by mass, more preferably in amounts of 0.2 to 0.8 percent by mass, based on the total mass of the respective digestion system.

If desired, the silanes and/or siloxanes provided with reactive acetoxy functions that are obtained from the operation according to the invention may be used again as adhesives and sealants, in the form, for example, of polymerization-active masses, optionally blended with further crosslinking silanes and/or siloxanes, and unfilled and/or filled with fillers.

It will be apparent to the person skilled in the art that the respective nature and chemical composition of the silicone used and intended for the recycling shapes the composition of the siloxanes containing acetoxy groups that are obtained by the method according to the invention.

In a preferred embodiment of the invention, the digestion system comprises acetic anhydride. The amount of acetic anhydride advantageously used here is guided both by the amount of silicone used for the recycling and by the desired target structure of the silane/siloxane bearing acetoxy groups (definition of the average chain length desired in each case via the amount of acetic anhydride used based on the amount of the silicone matrix to be recycled).

In the context of the present invention, the term "siloxane containing acetoxy groups" especially also relates to matter containing varying amounts of silanes having acetoxy groups, for example trimethylsilyl acetate, diacetoxydimethylsilane, etc.

The polymerization behavior of the silanes and/or siloxanes provided with reactive acetoxy groups that have been obtained in accordance with the invention can be shown just in a simple manual experiment by applying a small volume of about 0.5 to 2 ml to a black Bakelite cover. Particularly the still Brønsted-acidic acetoxysilanes/siloxanes polymerize very quickly under the influence of air humidity and leave an opaque, white silicone film.

Alternatively, the high reactivity of the acetoxysilanes and/or -siloxanes obtained by the process according to the invention also permits the transformation thereof, for example, to the corresponding alkoxysilanes/-siloxanes.

The removal of the desiliconized sheet-like structure from the liquid phase may be accomplished by the usual techniques, e.g. by filtration.

The possibilities in the method of the invention are further elucidated and illustrated below.

If, for example, in accordance with the invention, a white, single-sidedly siliconized release paper having a basis weight of 135 g/m2 (from Neptun Technologies GmbH) is introduced into an acetoxysiloxane with stirring and with addition of a Brønsted acid, the silicone coating is detached from the paper carrier within an exposure time of just 3 hours at 130° C. reaction temperature (inventive example 1). Left behind is a desiliconized paper with a slight brownish discoloration, which even in this form and/or after optional bleaching, can be processed further into any products which are obtained from cellulosic recycled materials in the paper industry.

The desiliconizing effect of the invention, referring to the detachment of the silicone layer from the paper carrier, can be impressively demonstrated by infrared-spectroscopic analysis of the paper surface.

The band positions that are characteristic of the presence of silicones, at wavenumbers between 1020 cm$^{-1}$ and 1099 cm$^{-1}$, are much, much smaller for the desiliconized paper in accordance with the invention than are the corresponding bands for the siliconized release paper. Moreover, the release paper desiliconized in accordance with the invention exhibits the band positions that are characteristic of the water bound to cellulosic OH groups, at between 3150 to around 3750 wave numbers, whereas the siliconized release paper has no signal positions at those points.

The effect surprisingly found in accordance with the invention, of desiliconization, can likewise be demonstrated convincingly using a siliconized, biaxially oriented polypropylene film (BOPP film) (Inventive Example 2).

Completely surprisingly and unforeseeably for the person skilled in the art, the method claimed in accordance with the invention is also suitable for the effective reutilization of siliconized PETP (polyethylene terephthalate) films. In spite of the use of concentrated sulfuric acid in the digestion system of the invention, the desiliconization in this case is not accompanied by disintegrating ester cleavage of the polyethylene terephthalate film (Inventive Example 3).

In one preferred embodiment, the digestion system claimed in accordance with the invention is contacted not just once but instead multiply with the sheet-like structures to be desiliconized, and in this way it is possible to control the concentration of the siloxane containing acetoxy groups in the digestion system. By employing analytical techniques such as, for example, $^{29}$Si-NMR spectroscopy, and also, for example, with the aid of viscosity measurements, it is then possible to characterize the siloxane containing acetoxy groups to an extent which allows it to be processed, in the sense of the European patent applications EP3611214A1, EP3611216A1, EP3611217A1, EP3611215A1 and also the as yet unpublished European patent application with the application Ser. No. 18/210,035.4, into valuable derivative products such as, for example, SiOC-linked polyether siloxanes, or else in the sense of the as yet unpublished European patent application with the application Ser. No. 19/200,055.2, into SiOC-linked silicone (meth)acrylates.

The chemical detachment of silicone layers from a siliconized release paper or from a siliconized polymeric film, in accordance with the invention, can be promoted by ensuring, during the heat treatment, that the carrier systems to be reutilized are moved in the sense of a translation in the digestion system.

In accordance with this teaching, in the case of rolled carrier systems, it is also possible in accordance with the invention to utilize an arrangement like that of a roll mill in order to perform the invention, by subjecting the release paper or polymer film to be desiliconized, wound to form a roll, to stretching on a roll mill, after which the roll is unwound and the unwound carrier is pulled through a dipping bath which consists of the digestion system of the invention and which has a controllable temperature.

As will be clear to the person skilled in the art, in this case the unrolling speed, the length of the dipping bath and, derived therefrom, the effective contact time of the carrier system with the digestion system are co-determinants, along with the temperature and other parameters, of the efficacy of the desiliconization procedure. If desired, after passage through the digestion system, the paper and/or film may additionally be pulled through a rinsing bath, optionally dried thereafter, and rolled up again elsewhere on the roll mill.

In the case of siliconized release papers or siliconized polymeric films which are in piece form, in another preferred embodiment of the invention, the heat treatment of the siliconized release paper or of the siliconized polymeric film is undertaken in a digestion system with introduction of mechanical energy.

A further subject of the invention lies in the use of a liquid digestion system comprising acetic anhydride and/or an acetoxysiloxane, and at least one Brønsted acid, optionally solvent, preferably with addition of acetic acid, for desiliconizing sheet-like siliconized structures, particularly siliconized papers or siliconized polymeric films. Regarding preferred embodiments of this subject, reference is made in its entirety to the preceding description.

EXAMPLES

Infrared spectroscopy is used as a means of characterizing the carrier surfaces. The measurements are performed on a Tensor 27 IR spectrometer from Bruker Optik GmbH, equipped with a MIRacle, Multiple Crystals CRY ATR unit from PIKE, fitted with a $106D0000 diamond ATR crystal, utilizing the OPUS 7.2 analytical software.

Inventive Example 1

Desiliconizing a Cellulose-Basic, Siliconized Release Paper

In a 500 ml four-necked round-bottomed flask with internal thermometer, KPG stirrer and top-mounted reflux condenser, 100 g of decamethylcyclopentasiloxane together with 12.5 g of acetic anhydride and 3.7 g of acetic acid and also 0.23 g of trifluoromethansulfonic acid (0.2 percent by mass, based on the reaction mixture) are heated at 150° C. for 6 hours with continual stirring. The mixture is allowed to cool to 130° C., and 15.4 g of siliconized release paper with a basis weight of 135 g/m2 (form Neptun Technologies GmbH) in the form of short strips are introduced with continuous stirring. The mixture is left with stirring at 130° C. for 3 hours, after which it is cooled to 25° C., at which point the desiliconized paper strips, with a slight brownish discoloration, are removed from the acetoxysiloxane by means of a fluted filter, the acetoxysiloxane passing through the fluted filter as a clear filtrate.

After the paper strips have been rinsed off with a small volume of acetone, the dry paper surface is subjected to analysis by vibration spectroscopy (IR analysis).

Here it is seen that the band positions characteristic of the presence of silicones, at wave numbers between 1020 $cm^{-1}$ and 1099 $cm^{-1}$, are considerably smaller in the case of the inventively desiliconized paper than are the corresponding bands for the siliconized release paper. Moreover, the inventively desiliconized release paper shows the band positions characteristic of the water bound to cellulosic OH groups, between 3150 to around 3750 wave numbers, while the siliconized release paper shows no signal positions at these points.

Inventive Example 2

Desiliconizing a Silicone-Coated BOPP Film a) Producing the Single-Sidedly Silicone-Coated BOPP Film (Non-Inventive)

A BOPP film from Innovia Films (Rayoweb® CR, corona-treated, clear, biaxially oriented polypropylene film for release film application) was subjected to corona pre-treatment with a generator power of 1 kW and then coated unilaterally with a commercial radiation-curing silicone acrylate, by combining a mixture consisting of 30 g of TEGO® RC 711 and 68 g of Tego® RC 902 with 2 g of the photoinitiator TEGO® Alb and applying the combined mixture using a five-roll coating unit from COATEMA® Coating Machinery GmbH, Dormagen, Germany, with a coat weight of around 1 $g/m^2$, and curing the coating by exposure to UV light from a medium-pressure mercury vapor lamp from IST® Metz GmbH, Nürtingen, Germany, at 60 W/cm and at a web speed of 100 m/min under a nitrogen atmosphere having a residual oxygen content of less than 50 ppm.

b) Desiliconizing the Single-Sidedly Silicone-Coated BOPP Film (Inventive)

In a 500 ml four-necked round-bottomed flask with internal thermometer, KPG stirrer and top-mounted reflux condenser, 70 g of decamethylcyclopentasiloxane together with 12.5 g of acetic anhydride and 3.7 g of acetic acid and also 0.60 g of sulfuric acid (0.6 percent by mass, based on the reaction mixture) are introduced with stirring and then a total of 10.0 g of the single-sidedly silicone-coated, biaxially oriented polypropylene (BOPP) film from a), cut into virtually rectangular pieces with a size of around 10 mm×20 mm, are heated at 120° C. for 4 hours. The mixture is allowed to cool to 25° C., at which point the desiliconized polypropylene strips are separated off from the acetoxysiloxane using a fluted filter, the acetoxysiloxane running through the fluted filter as a clear filtrate.

After the polypropylene strips have been rinsed off with a small volume of ethanol, the dry polypropylene surface is subjected to analysis by vibration spectroscopy (IR analysis).

In addition, an infrared spectrum of the untreated (=not inventively treated) BOPP film is recorded as a reference. At 1017.3 $cm^{-1}$ and 1088.0 $cm^{-1}$, the band positions of the untreated release liner film, which are characteristic of the silicone coating, are seen.

Conversely, in the case of the inventively desiliconized film, these characteristic band positions have disappeared entirely.

Inventive Example 3

Desiliconizing a Silicone-Coated PETP Film a) Producing the Single-Sidedly Silicone-Coated PETP Film (Non-Inventive)

A 50 µm polyethylene terephthalate film of Hostaphan® WDW/WDW CSRE 36-65 (white, biaxially oriented film), chemically pretreated on one side for improved adhesion of solvent-borne coatings and printing inks, is coated on this pretreated side with a commercial radiation-curing silicone acrylate, by combining a mixture consisting of 30 g of TEGO® RC 711 and 68 g of Tego® RC 902 with 2 g of the photoinitiator TEGO® A18 and applying the combined mixture using a five-roll coating unit from COATEMA® Coating Machinery GmbH, Dormagen, Germany, with a coat weight of around 1 $g/m^2$, and curing the coating by exposure to UV light from a medium-pressure mercury vapor lamp from IST® Metz GmbH, Nürtingen, Germany, at 60 W/cm and at a web speed of 100 m/min under a nitrogen atmosphere having a residual oxygen content of less than 50 ppm.

b) Desiliconizing the Single-Sidedly Silicone-Coated PETP Film (Inventive)

In a 500 ml four-necked round-bottomed flask with internal thermometer, KPG stirrer and top-mounted reflux condenser, 70 g of decamethylcyclopentasiloxane together with 12.5 g of acetic anhydride and 3.7 g of acetic acid and also 0.60 g of sulfuric acid (0.6 percent by mass, based on the reaction mixture) are introduced with stirring and then a total of 10.0 g of the single-sidedly silicone-coated, biaxially oriented polyethylene terephthalate (PETP) film from a), cut into virtually rectangular pieces with a size of around 10 mm×20 mm, are heated at 120° C. for 4 hours. The mixture is allowed to cool to 25° C., at which point the desiliconized polyester strips are separated off from the acetoxysiloxane using a fluted filter, the acetoxysiloxane running through the fluted filter as a clear filtrate.

After the polyester strips have been rinsed off with a small volume of ethanol, the dry polyester surface is subjected to analysis by vibration spectroscopy (IR analysis).

In addition, an infrared spectrum of the untreated (=not inventively treated) PETP film is recorded as a reference. At 1016.1 $cm^{-1}$ and 1087.4 $cm^{-1}$, the band positions of the untreated release liner film, which are characteristic of the silicone coating, are seen.

Conversely, in the case of the inventively desiliconized film, these characteristic band positions have disappeared entirely.

The invention claimed is:

1. A method for the physical reutilization of a siliconized structure comprising the following steps:
   a) treating the siliconized structure in a liquid digestion system comprising acetic anhydride and/or an acetoxysiloxane, and at least one Brønsted acid, and optionally solvent, and
   b) removing a desiliconized structure from the liquid phase.

2. The method according to claim 1, wherein a) takes place with supply of heat and/or with introduction of mechanical energy.

3. The method according to claim 2, wherein the mechanical energy is introduced into the digestion system in the form of stirring energy or ultrasound.

4. The method according to claim 3, wherein a heat treatment is undertaken in a) in a temperature range between 50° C. and 200° C.

5. The method according to claim 1, wherein the digestion system comprises
   a) acetic anhydride and Brønsted acid,
   b) acetic anhydride, siloxane cycles and/or hydroxy-functional siloxanes and Brønsted acid,
   c) acetoxysiloxane and Brønsted acid, and
   d) acetoxysiloxane, siloxane cycles and/or hydroxy-functional siloxanes acetic anhydride and Brønsted acid.

6. The method according to claim 1, wherein Brønsted acids used are protic acids with a pKa of less than −1.30, selected from the group consisting of nitric acid, methanesulfonic acid and p-toluenesulfonic acid.

7. The method according to claim 1, wherein the Brønsted acid used in the digestion systems is used in amounts of from 0.1 to 1.5 percent by mass, based on the total mass of the respective digestion system including acetic acid added with preference.

8. The method according to claim 1, wherein the siliconized structure comprises a polymeric film, more particularly formed of polyethylene (PE), polyethylene terephthalate (PET) or polypropylene (PP).

9. The method according to claim 1, wherein the solvent is acetic acid.

10. The method according to claim 1, wherein a heat treatment is undertaken in a) in a temperature range between 80° C. and 160° C.

11. The method according to claim 1, wherein a heat treatment is undertaken in a) in a temperature range between 120° C. and 150° C.

12. The method according to claim 1, wherein the Brønsted acids is a concentrated sulfonic acid having a pKa of less than −2.90.

13. The method according to claim 1, wherein the Brønsted acids has a pKa of less than −4.90 and selected from the group consisting of perfluoroalkanesulfonic acids, heptafluoropropanesulfonic acid, pentafluoroethanesulfonic acid, trifluoromethanesulfonic acid, perchloric acid, trifluoromethanesulfonic acid, sulfonic acid, and perfluoroalkylsulfonic acid ion exchange resins.

14. The method according to claim 1, wherein the Brønsted acid used in the digestion systems is used in amounts of from 0.15 to 1.0 percent by mass, based on the total mass of the respective digestion system including acetic acid.

15. The method according to claim 1, wherein the Brønsted acid used in the digestion systems is used in amounts of from 0.2 to 0.8 percent by mass, based on the total mass of the respective digestion system including acetic acid.

16. A method for the physical reutilization of a siliconized paper or a siliconized polymeric film, the method comprising the following steps:
   a) treating the siliconized paper or a siliconized polymeric film in a liquid digestion system comprising acetic anhydride and/or an acetoxysiloxane, and at least one Brønsted acid, and optionally solvent, and
   b) removing a desiliconized siliconized paper or a siliconized polymeric film from the liquid phase.

17. The method according to claim 16, wherein the solvent is acetic acid.

18. The method according to claim 16, wherein a heat treatment is undertaken in a) in a temperature range between 120° C. and 150° C.

19. The method according to claim 16, wherein the digestion system comprises
   a) acetic anhydride and Brønsted acid,
   b) acetic anhydride, siloxane cycles and/or hydroxy-functional siloxanes and Brønsted acid,
   c) acetoxysiloxane and Brønsted acid, and
   d) acetoxysiloxane, siloxane cycles and/or hydroxy-functional siloxanes acetic anhydride and Brønsted acid.

20. The method according to claim 16, wherein the siliconized polymeric film comprises a monoaxially or biaxially oriented polypropylene (MOPP/BOPP).

* * * * *